(12) United States Patent
Pickrell et al.

(10) Patent No.: US 11,674,888 B2
(45) Date of Patent: Jun. 13, 2023

(54) SELF-ALIGNED HIGH FINESSE OPTICAL SENSOR CELL

(71) Applicant: GLOBAL ANALYZER SYSTEMS LIMITED, Calgary (CA)

(72) Inventors: Kelly Pickrell, Calgary (CA); Charles Anim Odame-Ankrah, Calgary (CA); Brian Wayne Rosentreter, Calgary (CA)

(73) Assignee: GLOBAL ANALYZER SYSTEMS LIMITED, Calgary (CA)

( * ) Notice: Subject to any disclaimer, the term of this patent is extended or adjusted under 35 U.S.C. 154(b) by 0 days.

(21) Appl. No.: 17/257,471

(22) PCT Filed: Jul. 3, 2019

(86) PCT No.: PCT/CA2019/050917
§ 371 (c)(1),
(2) Date: Dec. 31, 2020

(87) PCT Pub. No.: WO2020/006633
PCT Pub. Date: Jan. 9, 2020

(65) Prior Publication Data
US 2021/0131947 A1    May 6, 2021

Related U.S. Application Data

(60) Provisional application No. 62/693,594, filed on Jul. 3, 2018.

(51) Int. Cl.
*G01N 21/01* (2006.01)
*G01N 21/25* (2006.01)
*G02B 5/10* (2006.01)

(52) U.S. Cl.
CPC .......... *G01N 21/01* (2013.01); *G01N 21/255* (2013.01); *G02B 5/10* (2013.01)

(58) Field of Classification Search
CPC ..... G01N 2021/7789; G01N 2021/391; G01N 2021/399; G01N 21/01; G01N 21/031;
(Continued)

(56) References Cited

U.S. PATENT DOCUMENTS

| 4,370,553 A | 1/1983 | Waycaster et al. |
| 4,653,880 A | 3/1987 | Sting et al. |

(Continued)

FOREIGN PATENT DOCUMENTS

| EP | 0653057 | 5/1997 |
| WO | WO 2020006633 | 1/2020 |

OTHER PUBLICATIONS

Office Action in Indian Appln. No. 202027055603, dated Oct. 17, 2022, 6 pages (with English translation).

(Continued)

*Primary Examiner* — Violeta A Prieto
(74) *Attorney, Agent, or Firm* — Fish & Richardson P.C.

(57) ABSTRACT

The present invention provides a self-aligned high finesse optical sensor cell for analyzing a gaseous sample using highly reflective optical mirrors with a light source and a detector coupled on either end of the cell, having flexibility and/or serviceability in self-aligning the highly reflective mirrors to the optical cell without any mechanical manipulations.

20 Claims, 7 Drawing Sheets

(58) Field of Classification Search
CPC ........... G01N 21/255; G01J 3/42; G02B 5/10; G02B 7/182
See application file for complete search history.

(56) References Cited

U.S. PATENT DOCUMENTS

| | | | |
|---|---|---|---|
| 5,135,304 A | 4/1992 | Miles et al. | |
| 5,528,040 A | 6/1996 | Lehmann | |
| 5,960,025 A | 9/1999 | Thorland et al. | |
| 6,194,735 B1 | 2/2001 | Martin | |
| 7,046,362 B2 | 5/2006 | Lehmann et al. | |
| 7,541,586 B2 | 6/2009 | Miller | |
| 7,569,823 B2 | 8/2009 | Miller | |
| 9,606,093 B2 | 3/2017 | Alquaity et al. | |
| 9,709,491 B1 | 7/2017 | Murphy et al. | |
| 2004/0160605 A1* | 8/2004 | Wang | G01J 3/42 356/437 |
| 2006/0183241 A1* | 8/2006 | Lehmann | G01J 3/42 436/164 |
| 2007/0133001 A1* | 6/2007 | Cox | G01J 3/42 250/357.1 |
| 2009/0323055 A1* | 12/2009 | Cole | G01N 21/39 356/300 |
| 2012/0170043 A1* | 7/2012 | Rao | G01N 21/39 356/437 |
| 2014/0110599 A1 | 4/2014 | Lehman | |
| 2014/0319352 A1* | 10/2014 | Gupta | G01N 21/39 250/339.07 |
| 2016/0084757 A1 | 3/2016 | Miron | |
| 2017/0256909 A1* | 9/2017 | Braddell | G01J 3/42 |
| 2018/0306713 A1* | 10/2018 | Rao | G01J 3/42 |
| 2021/0190645 A1* | 6/2021 | Hargrove | G01N 1/34 |
| 2021/0389235 A1* | 12/2021 | Mano | G01N 33/004 |

OTHER PUBLICATIONS

PCT International Preliminary Report on Patentability in International Application No. PCT/CA2019/050917, dated Jan. 5, 2021, 6 pages.

PCT International Search Report and Written Opinion in International Application No. PCT/CA2019/050917, dated Oct. 3, 2019, 10 pages.

EP Extended Search Report in European Appln. No. 19830566.6, dated Feb. 14, 2022, 11 pages.

* cited by examiner

SELF-ALIGNED HIGH FINESSE OPTICAL SENSOR CELL

CROSS-REFERENCE TO PRIOR APPLICATION

This is the U.S. National Phase Application under 35 U.S.C. § 371 of International Patent Application No. PCT/CA2019/050917 filed Jul. 3, 2019, which claims priority to U.S. Provisional Application No. 62/693,594, filed Jul. 3, 2018, both of them are incorporated by reference herein. The International Application was published on Jan. 9, 2020 as WO2020/006633 A1 under PCT Article 21(3).

FIELD OF THE INVENTION

The present invention pertains to the field of absorption spectroscopy using a high finesse optical cavity cell. In particular, the present invention relates to a highly reflective (HR mirror) mounting device for creating a high finesse optical cavity cell.

BACKGROUND OF THE INVENTION

Cavity enhanced spectroscopic technologies, typically Cavity Ring Down Spectroscopy (CRDS) and its variations, are robust technologies for measuring gas phase target molecule concentrations at known light wavelength(s).

All cavity enhanced technologies require a precision aligned optical cavity with high finesse. This has introduced a challenge to the development of robust field instrumentation which must meet vibration, drop and pressure variations when it comes to geometric and optical alignment of the mirrors and sample cavity with the light source. Existing commercial optical cavities are typically pre-aligned by the manufacturer hence they are typically complex, if not impossible, to re-align by a user.

U.S. Pat. No. 5,528,040 discloses an apparatus for detection and measurement of trace species in a sample gas comprising a ring down cavity cell wherein the highly reflective (HR) mirrors constituting the input and output windows of optical cell are either pre-aligned or the HR mirrors may be placed on adjustable flanges or mounts that are sealed with vacuum tight bellows to allow adjustment of the optical alignment of cell, thereby having a rigid requirement for a precisely aligned optical cell.

US Publication No. 2007/0133001 discloses a fluid detecting sensor comprising a triangular shaped block having a closed loop/ring-like optical path (for light propagation) defined by a plurality of bores connected end to end in the block. The sensor of this patent requires a complicated arrangement of HR mirrors to achieve the desired optical path.

There is therefore need for simple optical sensor cells which can automatically assure HR mirror and optical cavity alignment, enabling HR mirrors to be easily changed or serviced without the need for mechanical manipulations of the laser beam and/or HR Mirrors of the high finesse cavity.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a self-aligned high finesse optical sensor cell for analyzing a gaseous sample using a light source.

In accordance with an aspect of the present invention there is provided a high finesse optical sensor cell for analyzing a gaseous sample using a light source, which comprises a housing defining a linear optical cavity, having an optical axis extending between a first open end portion and a second open end portion of the housing. The first open end portion of the housing is provided with a first mirror assembly, and the second open end portion of the housing is provided with a second mirror assembly.

The housing further comprises a first set of contact geometry located adjacent to a first end of the optical cavity, and a second set of contact geometry located adjacent to a second end of the optical cavity, wherein at least the first set of contact geometry is radially symmetrical about the optical axis, and wherein the first set of contact geometry defines a planar contact surface that is perpendicular to the optical axis of the optical cavity, the first and second ends of the optical cavity being located within the first and second open end options of the housing, respectively, and an inlet port and an outlet port for conveying the gaseous sample into and out of the optical cavity.

The first HR mirror assembly comprise a first HR mirror having a concave reflective surface; and a first end cover configured to cover the open end of the first open end portion and to maintain the concave surface of the first HR mirror in contact with the first set of contact geometry. The first end cover also has an opening for receiving an entrant beam of light coincident with the optical axis. The second HR mirror assembly comprises a second HR mirror having a reflective surface. The second end cover is configured to cover the open end of the second open end portion and to maintain the reflective surface of the second HR mirror in contact with the second set of contact geometry. The second end cover also has an opening for emitting the beam of light to a detector coincident with the optical axis. The center of curvature of the first concave HR mirror is in alignment (coincident) with the optical axis of the optical cavity.

In accordance with another aspect of the invention, there is provided a sensor system, comprising a sensor cell as described herein, a light source for providing an entrant light beam which is directed into the optical cavity and along the optical axis, and a detector for detecting light exiting the optical cavity along the optical axis.

BRIEF DESCRIPTION OF THE FIGURES

The invention will now be described by way of exemplary embodiments with reference to the accompanying simplified, diagrammatic, not-to-scale drawings. In the drawings.

DETAILED DESCRIPTION OF THE INVENTION

Definitions

Unless defined otherwise, all technical and scientific terms used herein have the same meaning as commonly understood by one of ordinary skill in the art to which this invention belongs.

As used herein, the term "highly reflective (HR) mirror" refer to a mirror having a reflectivity value of at least 99.00%.

As used herein, the term "about" refers to a +/−10% variation from the nominal value. It is to be understood that such a variation is always included in a given value provided herein, whether or not it is specifically referred to.

The present invention relates to a optical cell for spectroscopy, where the geometry of components which registers/contacts the HR mirrors (i.e. contact geometry) assures HR mirror and cell (or optical cavity) alignment without requiring any mechanical adjustment.

As the embodiments of the present invention that are described herein obviate the need for mechanical manipulations of the HR mirrors and/or optical cavity in order to achieve the necessary alignment enabling a high finesse optical cavity, the optical cell of the present invention is easier to manufacture, assembled and serviced (i.e. changing and/or cleaning of mirrors and other parts). In particular, the optical cell of the present invention can be easily serviced in field without a need to be sent to a service lab.

The present invention provides a high finesse optical sensor cell for analyzing a gaseous sample using a light source. The sensor cell comprises a housing defining a linear optical cavity, having an optical axis, which extends between a first open end and a second open end of the housing. A first set of contact geometry is located adjacent to a first end of the optical cavity, and a second set of contact geometry located adjacent a second end of the optical cavity. The first and second ends of the optical cavity are located within the first and second open end options of the housing. At least the first set of contact geometry is radially symmetrical about the optical axis, and the first set of contact geometry lies on a plane to provide a planar contact surface that is perpendicular to the optical axis of the optical cavity.

The housing also comprises an inlet port and an outlet port for conveying the gaseous sample into and out of the optical cavity.

The sensor cell is provided with a first mirror assembly at the first open end portion of the housing, and a second mirror assembly at the second open end portion of the housing.

The first mirror assembly comprises a first highly reflective (HR) mirror having a concave reflective surface, and a first end cover configured to cover the open end of the first open end portion of the housing and to maintain the concave surface of the first HR mirror in contact with the first set of contact geometry. The first end cover also has an opening for receiving an entrant beam of light coincident with the optical axis. The center of curvature of the first concave HR mirror is in alignment (coincident) with the optical axis of the optical cavity.

The second mirror assembly comprises a second HR mirror having a reflective surface, and a second end cover configured to cover the open end of the second open end portion of the housing and to maintain the reflective surface of the second HR mirror in contact with the second set of contact geometry located adjacent the second end of the optical cavity within the second end portion. The second end cover also has an opening for emitting the beam of light to a detector coincident with the optical axis.

In preferred embodiments, the contact geometries are integral to the housing.

In some embodiments, the contact geometries are provided at the periphery of the respective first and second ends of the optical cavity.

In some embodiments, the housing comprises a ring member provided at the periphery of the first end and, optionally at the second end of the optical cavity.

In some embodiments, the housing comprises a ring member provided at the periphery of the first end of the optical cavity.

In some embodiments, the first set of contact geometry is comprised of at least three coplanar points provided on an outer/end surface and/or an edge surface of the ring member, and the at least three coplanar points are adapted to contact the concave surface of the first HR mirror.

In some embodiments, the first set of contact geometry is the entire edge surface of the ring member provided at the periphery of the first end of the optical cavity. In some embodiments, the first set of contact geometry is the entire outer/end surface of the ring member provided at the periphery of the first end of the optical cavity.

In some embodiments, the second HR mirror has a flat reflective surface, and the second set of contact geometry positions the flat reflective HR mirror surface perpendicular to the axis of the optical cavity.

In some embodiments, the second set of contact geometry is comprised of at least three points provided on an outer surface of a ring member provided at the periphery of the second end of the optical cavity, and the at least three points, are adapted to contact the flat surface of the second HR mirror.

In some embodiments, the second HR mirror has a concave reflective surface. In such embodiments, the second set of contact geometry is radially symmetrical about the optical axis, and the second set of contact geometry lies on a plane to provide a planar contact surface that is perpendicular to the optical axis of the optical cavity, such that the center of curvature of the second concave HR mirror is in alignment (coincident) with the optical axis of the optical cavity.

In some embodiments, the housing comprises a ring member provided at the periphery of the second end of the optical cavity. In some embodiments, the second set of contact geometry is comprised of at least three coplanar points provided on an outer surface and/or an edge surface of the ring member, wherein at least three coplanar points are adapted to contact the concave surface of the second HR mirror.

In some embodiments, the second set of contact geometry is the entire edge surface of the ring member provided at the periphery of the second end of the optical cavity.

In some embodiments, the second set of contact geometry is defined by the entire outer/end surface of the ring member provided at the periphery of the second end of the optical cavity, and, the outer surface of the ring member has a convex surface, which is adapted to match with the HR mirror's concave surface.

In some embodiments the cavity may incorporate more than two HR mirrors, such as folded beam path arrangements.

In some embodiments, one or more sealing members are provided between the outer surface of the ring member and the HR mirror at location(s) which are different than the location(s) of the contact geometries. In some embodiments, the one or more sealing members are provided in a location radially inward of the contact geometries. In some embodiments, the one or more sealing members are provided in a location radially outward of the contact geometries.

In some embodiments, at least the first end cover is configured for removable attachment to the first open end portion of the housing.

In some embodiments, both of the first and second end covers are configured for removable attachment to the respective open end portions of the housing.

In some embodiments, at least the first mirror assembly comprises a mirror pressing resilient member between the HR mirror and an inner surface of the end cover.

In some embodiments, both of the first and second mirror assemblies comprise a mirror pressing resilient member between the respective HR mirror and an inner surface of the respective end cover. Non limiting examples of such resilient members are compression springs, O-rings and gaskets.

In some embodiments, the resilient member is an O-ring made of a resilient material. Non limiting examples of suitable resilient materials are rubber and sponge.

In another aspect, the present invention relates to a sensor system, comprising the sensor cell as defined herein, a light source for providing an entrant light beam which is directed into the optical cavity and along the optical axis, and a detector for detecting light exiting the optical cavity along the optical axis.

In preferred embodiments, the entrant light beam is coincident with the optical axis.

In some embodiments, the light source for the entrant light beam is a laser source.

The laser source can be a tunable laser light source, such as a diode laser, a vertical cavity surface emitting laser (VCSEL), or other type of tunable laser. The tunable laser may have its wavelength varied for detecting and analyzing various fluids. The wavelength may be pre-programmed or varied real-time during detection and analysis.

In some embodiments, the system further comprises a data acquisition and analysis circuit connected to the detector.

In some embodiments, the sensor further comprises control electronics connected to the laser.

A laser pulse is introduced through one HR mirror and is reflected back by another HR mirror, resulting in a standing optical wave generated between the HR mirrors. After a period of time, the detector external to one of the HR mirrors is used to measure characteristics of the decaying standing wave.

All the optical and mechanical components of the sensor system are configured to output an electric signal in response to an intensity of electromagnetic radiation that is incident on the one of the optical components (individual HR mirrors). An absorbing molecule at the radiation present in the hollow section of the cavity attenuates a component of the light reaching the second HR mirror. A sensing device is aligned behind the second HR mirror to convey the photons exiting the second HR mirror and transform it to an electrical signal. The electrical signal is conveyed and processed by a computer to generate information useful for determining the levels of absorbing target molecule(s) within the path of the light in the cavity.

The housing and the contact geometries for the HR mirrors of the sensor cell of the present invention ensures that the centers of curvature of the surfaces of curved HR mirror(s) are aligned/co-incident with the optical axis, irrespective of HR mirror positional skew and/or imperfect mirror geometry conditions, such as mirror manufacturing tolerances of wedge and centration, as long as mirror's concave surface is spherical.

To gain a better understanding of the invention described herein, the following examples are set forth. It will be understood that these examples are intended to describe illustrative embodiments of the invention and are not intended to limit the scope of the invention in any way.

EXAMPLES

Figure 1A:
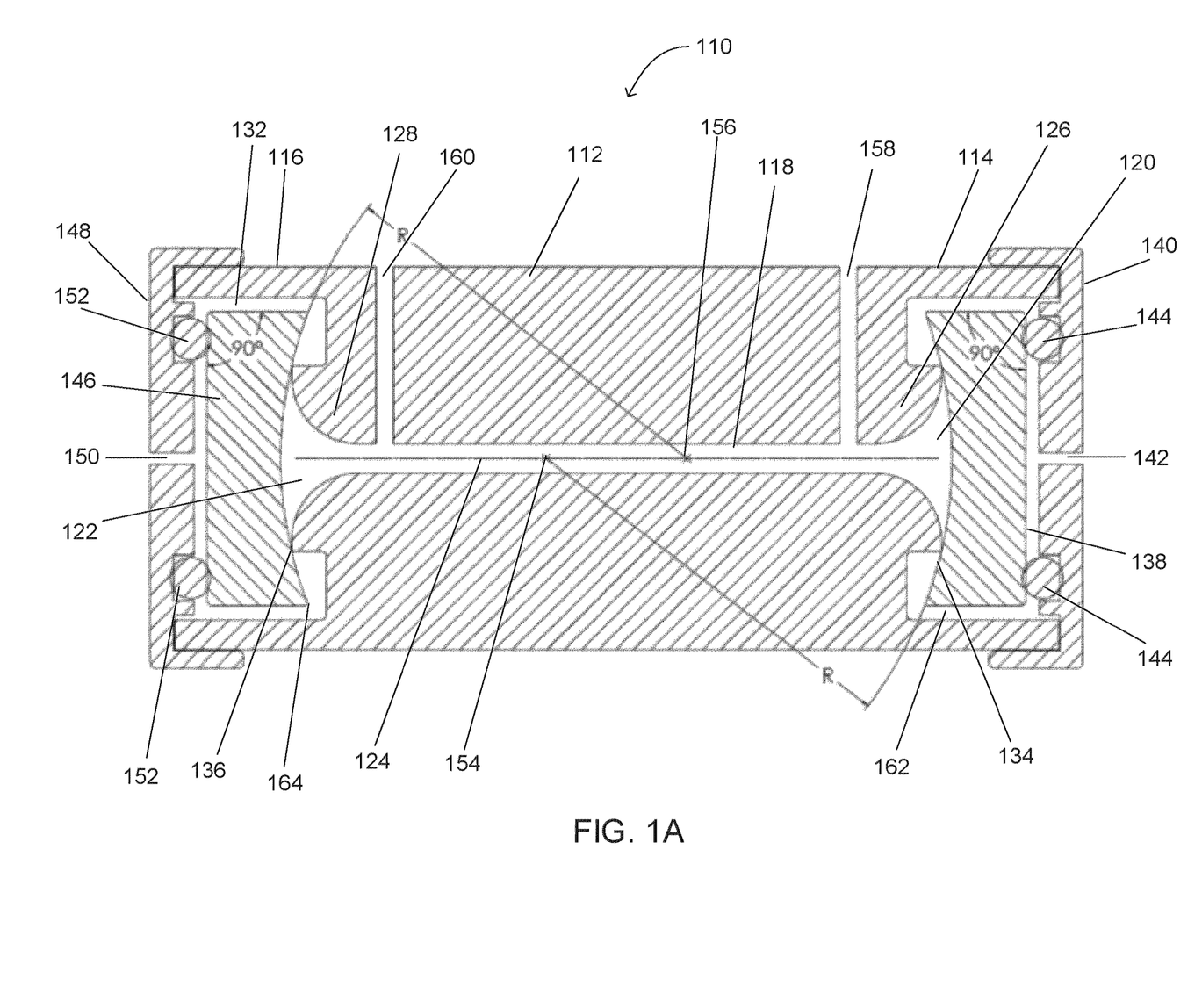
FIG. 1A illustrates a cross sectional view of a sensor cell in accordance with an embodiment of the present invention.

FIG. 1A illustrates a cross sectional view of an exemplary sensor cell 110 of the present invention, which comprises an elongated housing 112 having an first open end portion 114 and a second open end 116 portion. The housing defines a linear optical cavity 118 extending between the two open end portions. The optical cavity 118 has a first end 120 and a second end 122, and an optical axis 124.

Figure 1B:
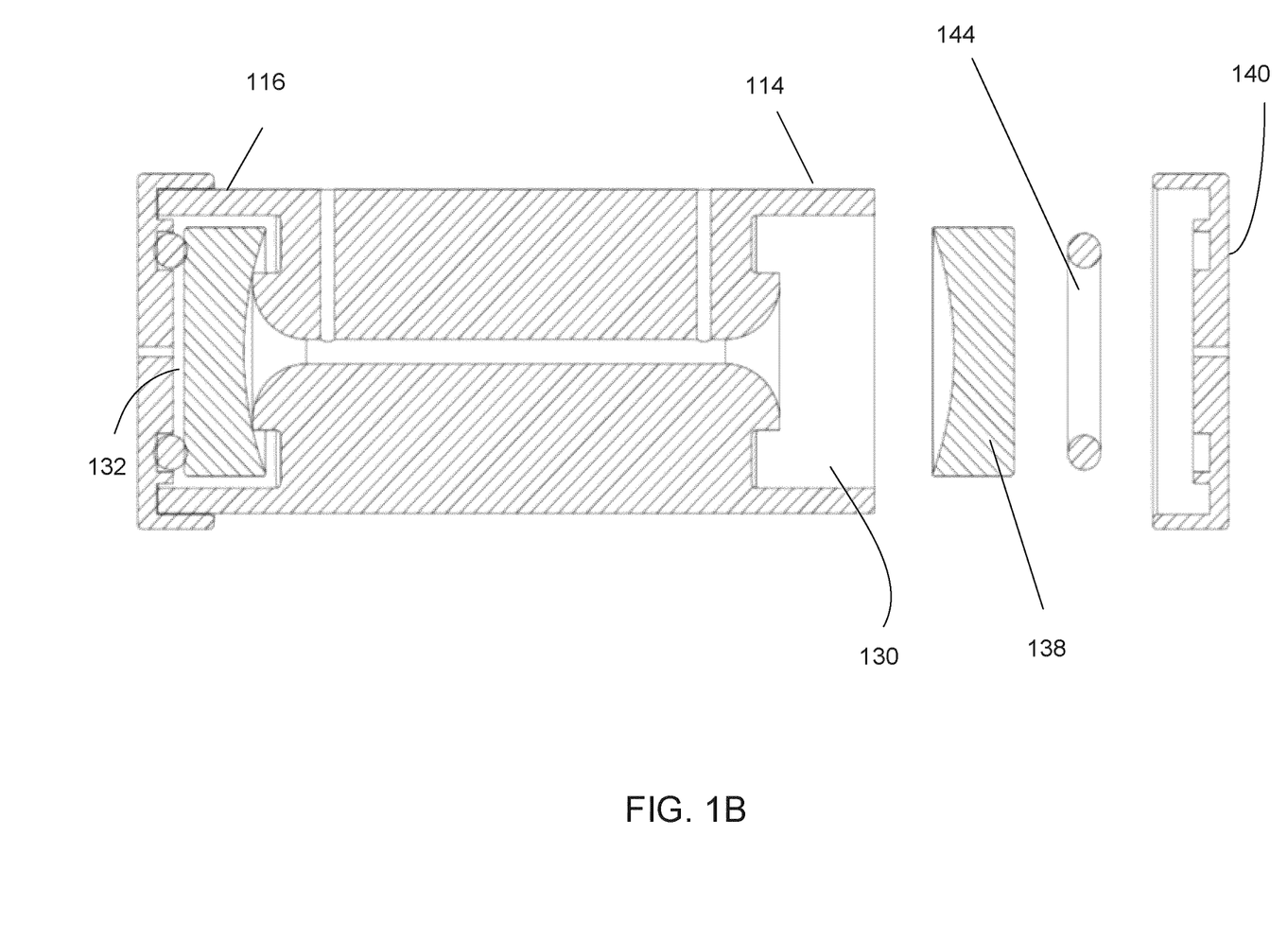
FIG. 1B illustrates a partially exploded view of the sensor cell of FIG. 1A.

In the embodiment depicted in FIGS. 1A and 1B, the housing has a first ring member 126 and a second ring member 128 formed at the opposite ends of the optical cavity 118.

In this embodiment, a first set of contact geometry is defined/provided by the edge surface 134 of the first ring member 126, and a second contact geometry is defined/provided by the edge surface 136 of the second ring member 128. A first HR mirror assembly comprising a first HR mirror 138 and a first end cover/cap 140 is provided at the first open end portion 114 of the housing. A second HR mirror assembly comprising a second HR mirror 146 and a second end cover/cap 148 is provided at the second open end portion 116 of the housing.

The first end cover has opening 142 for receiving an entrant beam of light coincident with the optical axis, and the second end cover has opening 150 for emitting the beam of light to a detector coincident with the optical axis. Each HR mirror assembly also comprises respective rubber O-ring 144, 152 between the HR mirror and the end cover for resiliently pressing the respective outer surface of the HR mirror to ensure contact of the concave face of the mirrors with the respective contact geometries. The edges of the first and second mirrors have a radial clearance 162 and 164, respectively, from the inner surface of the adjacent housing wall.

In this embodiment, both of the first and second HR mirrors are curved HR mirrors, and the edge surfaces 134 and 136 of the ring members 126 and 128 are defining the first and second contact geometries, which are radially symmetrical about the optical axis 124, and each provide planar contact surface that is perpendicular to the optical axis of the optical cavity. When the HR mirrors are placed in contact with their respective contact geometries/edge surfaces, the center of curvature 154 of the first concave HR mirror and the centre of curvature 156 of the second concave HR mirror aligns/co-incident with the optical axis 124 of the optical cavity.

The housing further comprises an inlet port 158 and an outlet port 160 for conveying the gaseous sample into and out of the optical cavity.

FIG. 1B depicts a partial exploded view of the sensor of FIG. 1A. As clear from this view, the open end portions 114 and 116 define cavities 130 and 132, respectively. The ends 120 and 122 of the optical cavity 118 are located within their respective cavities.

Figure 2:
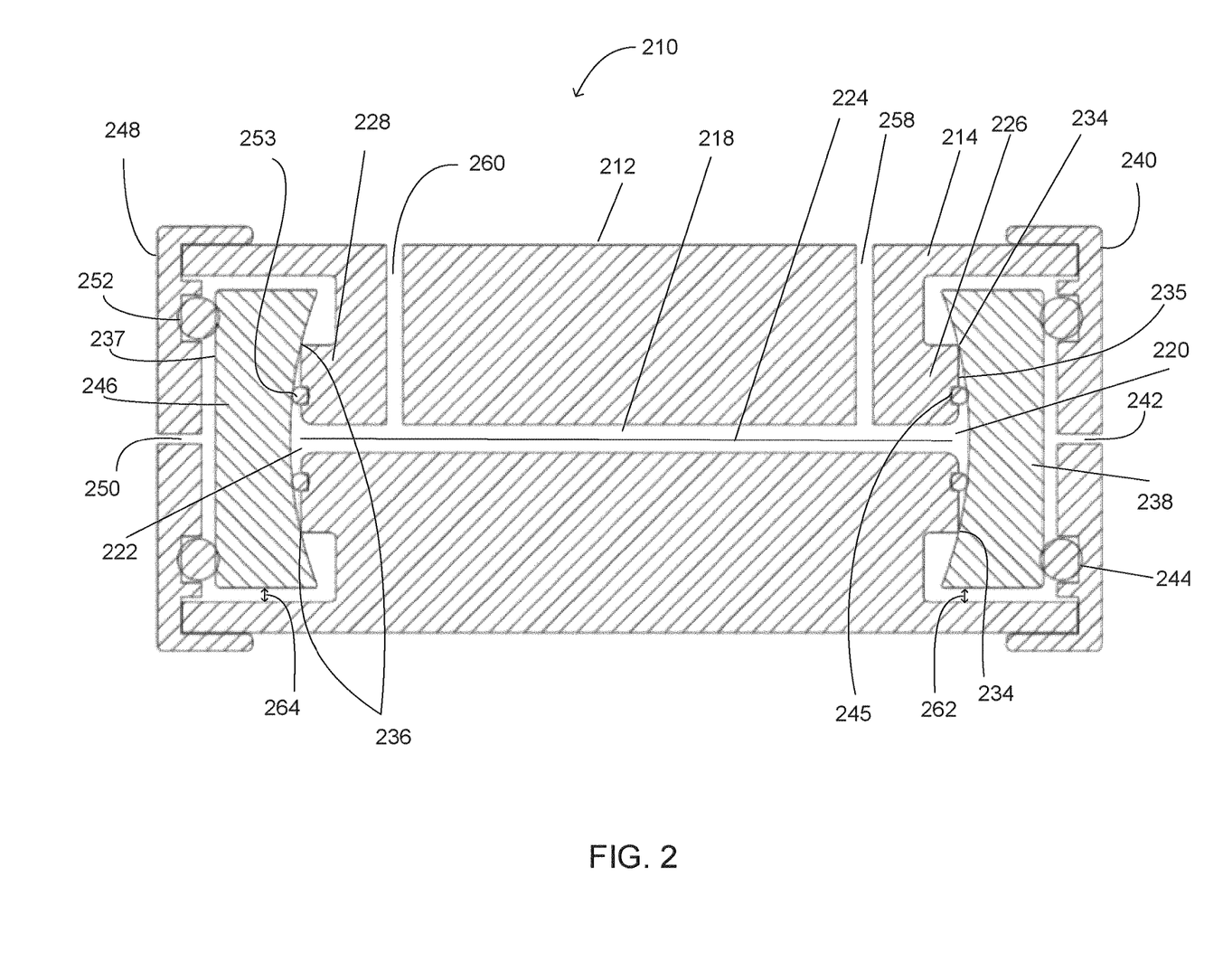
FIG. 2 illustrates a cross sectional view of a sensor cell in accordance with another embodiment of the present invention.

FIG. 2 illustrates a cross a sectional view of another embodiment of an exemplary sensor cell 210 of the present invention, which comprises an elongated housing 212 having an first open end portion 214 and a second open end 216 portion. The housing is defining a linear optical cavity 218 between the two end portions. The optical cavity 218 has a first end 220 and a second end 222, and an optical axis 224. The housing has a first ring member 226 and a second ring member 228 formed at the opposite ends of the optical cavity 218.

A first set of contact geometry is defined/provided by the edge surface 234 of the first ring member 226, and a second contact geometry is defined/provided by the edge surface 236 of the second ring member 228. A first HR mirror assembly comprising a first HR mirror 238 and a first end cover/cap 240 is provided at the open end portion 214 of the housing. A second HR mirror assembly comprising a second HR mirror 246 and a second end cover/cap 248 is provided at the end portion 216 of the housing. The first end cover has opening 242 for receiving an entrant beam of light coincident with the optical axis, and the second end cover has opening 250 for emitting the beam of light to a detector coincident with the optical axis. Each HR mirror assembly also comprises a HR mirror pressing rubber O-ring 244, 252 between the HR mirror and the end cover for resiliently pressing the respective outer surface of the HR mirror to ensure contact of the concave face of the mirrors with the respective contact geometries.

In this embodiment both of the first and second HR mirrors are curved HR mirrors, and the edge surfaces 234 and 236 of the ring members 226 and 228 define the contact geometries, which are radially symmetrical about the optical axis 224, and each provide a planar contact surface that is perpendicular to the optical axis of the optical cavity.

In this embodiment, sealing members 245, 253 are provided on the end surfaces 235, 237 of the ring members 226 and 228, respectively. The sealing members are positioned radially inward of the respective edge surface 234, 236, to ensure engagement between the outer surface of the respective ring member and the concave face of the HR mirror.

The lateral edges of the first and second mirrors have a radial clearance 262 and 264, respectively from the inner surface of the adjacent housing wall. The housing further comprises an inlet port 258 and an outlet port 260 for conveying the gaseous sample into and out of the optical cavity.

Figure 3:
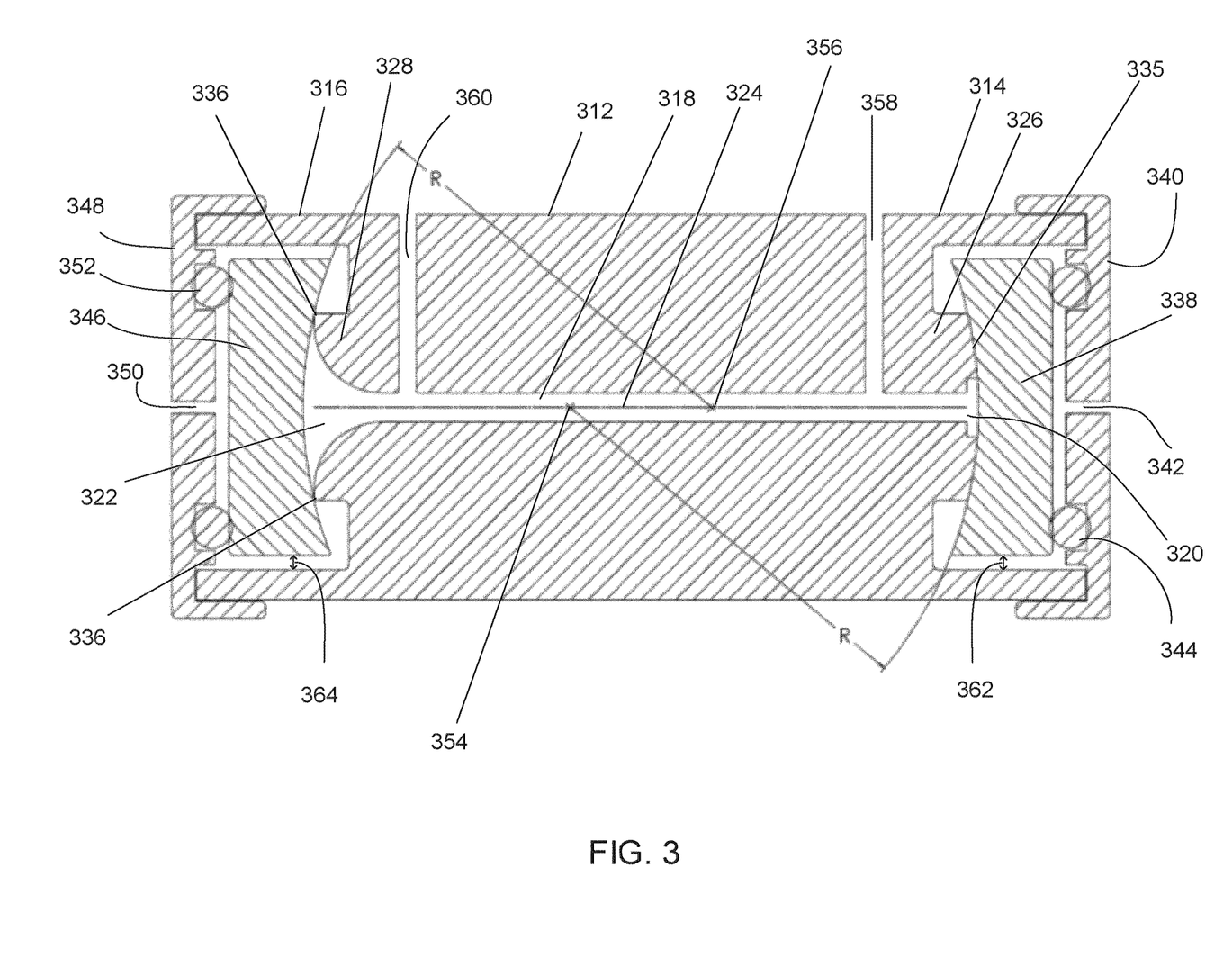
FIG. 3 illustrates a cross sectional view of a sensor cell in accordance with another embodiment of the present invention.

FIG. 3 illustrates a cross sectional view of another embodiment of an exemplary sensor cell 310 of the present invention, which comprises an elongated housing 312 having a first open first end portion 314 and a second open end portion 316. The housing defines a linear optical cavity 318 between the two end portions. The optical cavity 318 has a first end 320 and a second end 322, and an optical axis 324. The housing has a first ring member 326 and a second ring member 328 formed at the opposite ends of the optical cavity 318.

A first mirror assembly comprising a first HR mirror 338 and a first end cover/cap 340 is provided at the first open end portion 314 of the housing. A second HR mirror assembly comprising a second HR mirror 346 and a second end cover/cap 348 is provided at the second open end portion 316 of the housing.

In this embodiment, a first set of contact geometry is defined/provided by the spherical convex surface 335 of the ring member 326 machined to match exactly with the spherically concave surface of the mirror 338. A second contact geometry is defined/provided by the edge surface 236 of the second ring member 328.

The first end cover has opening 344 for receiving an entrant beam of light coincident with the optical axis, and the second end cover has opening 350 for emitting the beam of light to a detector coincident with the optical axis. Each mirror assembly also comprises respective O-ring 344, 352 between the HR mirror and the end cover for resiliently pressing the respective outer surface of the HR mirror to ensure contact of the concave face of the mirrors with the respective contact geometries. The edges of the first and second mirrors have a radial clearance 362 and 364, respectively from inner surface of the adjacent housing wall.

In this embodiment, both of the first and second HR mirrors are curved HR mirrors. The contact geometries are provided by the convex surface 335 of the ring member 326, and the edge surface 336 of the ring member 328. When the HR mirrors are placed in contact with their respective contact geometries/edge surfaces, the center of curvature 354 of the first concave HR mirror and the centre of curvature 356 of the second concave HR mirror aligns/co-incident with the optical axis 324 of the optical cavity. The housing further comprises an inlet port 338 and an outlet port 360 for conveying the gaseous sample into and out of the optical cavity.

The embodiments depicted in FIGS. 1A, 2 and 3, have HR mirrors having perfect or nearly perfect geometries. The present invention also ensures alignment irrespective of HR mirror positional skew and/or on imperfect mirror geometry conditions as illustrated in FIGS. 4 to 6.

Figure 4:
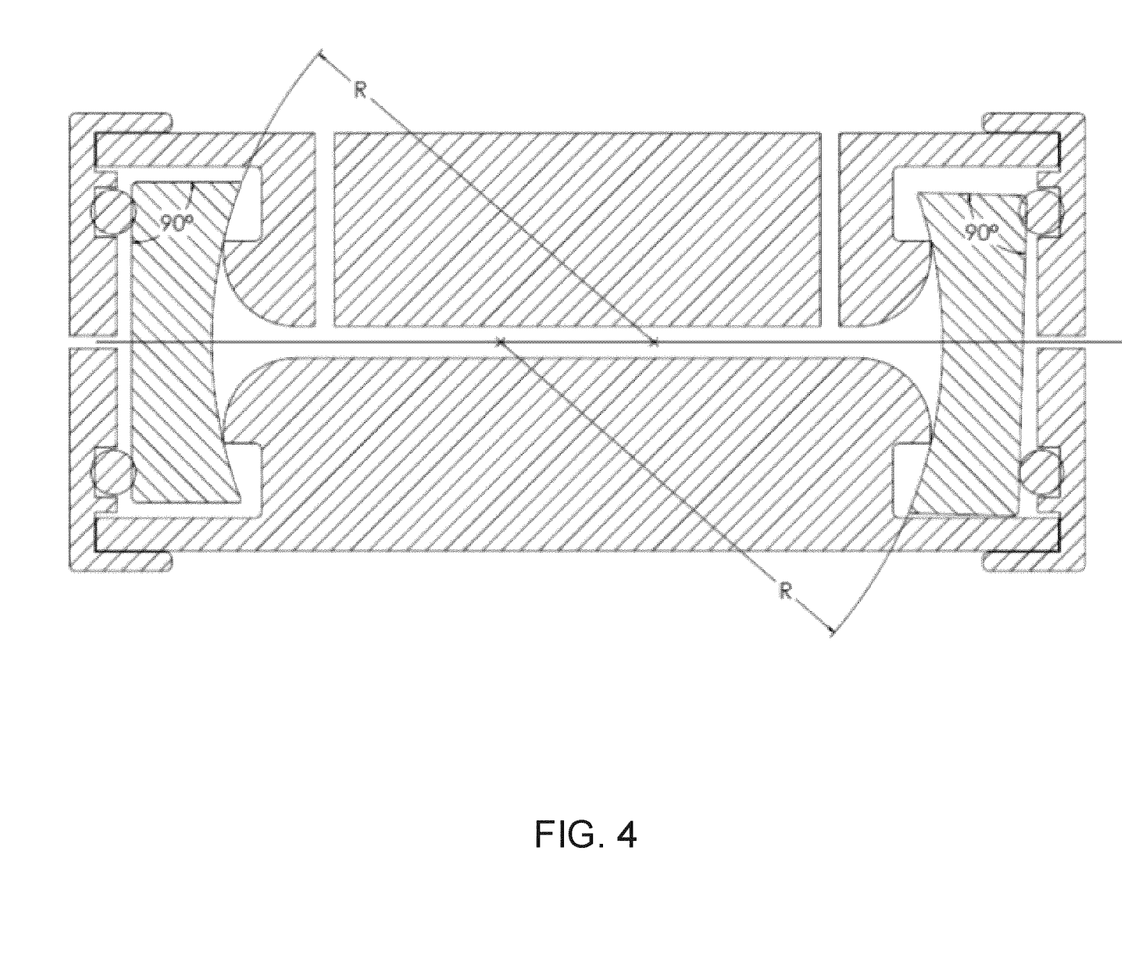
FIG. 4 illustrates a cross sectional view of a sensor cell in accordance with the embodiment of FIGS. 1A and 1B, showing one mirror in a skewed position.

FIG. 4 depicts a sensor cell similar to as depicted in FIG. 1A, with the difference that, although it has geometrically perfect left and right HR mirrors, the right HR mirror is positionally skewed.

Figure 5:
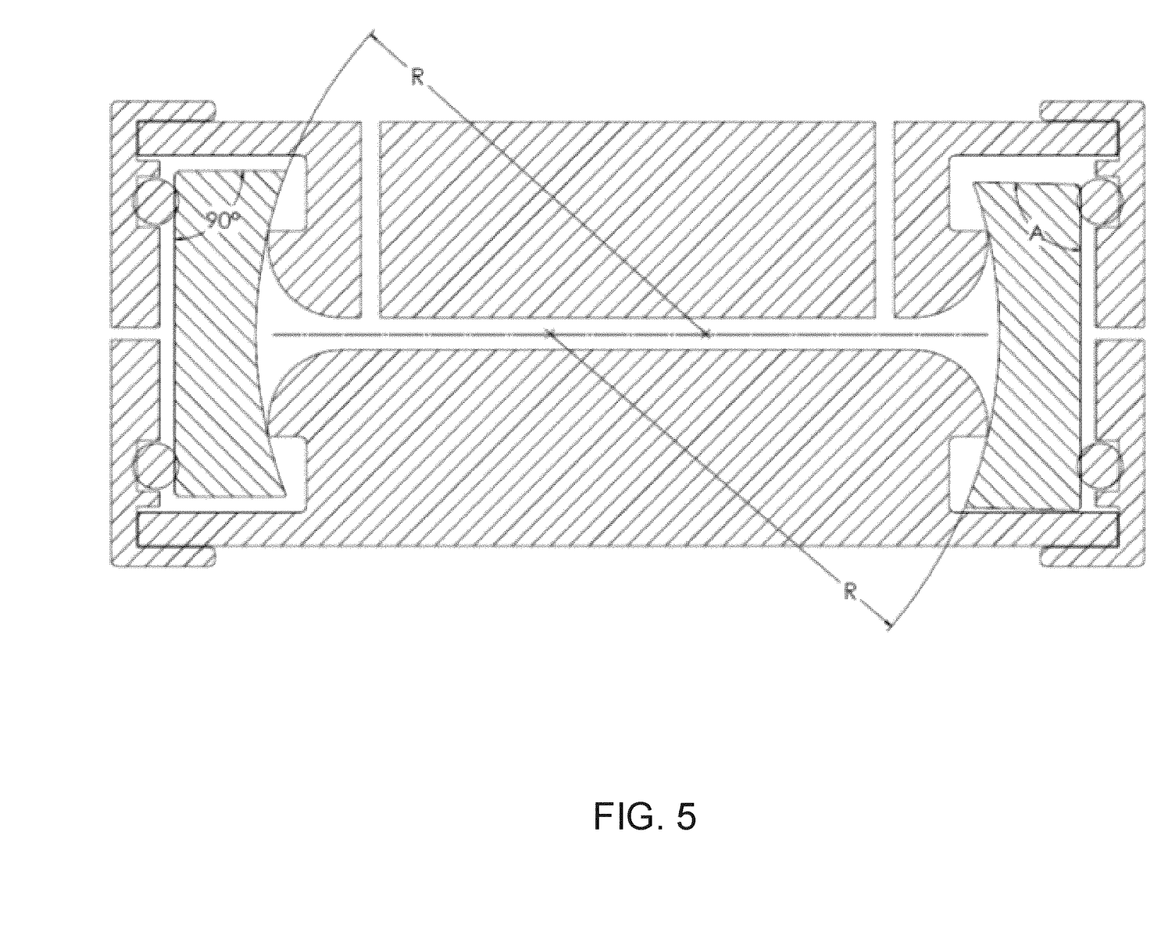
FIG. 5 illustrates a cross sectional view of a sensor cell in accordance with another embodiment of the present invention, with one geometrically imperfect mirror in a skewed position.

FIG. 5 depicts a sensor cell similar to as depicted in FIG. 1A, with the difference that it has geometrically perfect and unskewed left HR mirror, and geometrically imperfect right HR mirror (i.e. wedge tolerance), as depicted by angle "A" with shown deviation from 90° as compared to the angle of the geometrically perfect left HR mirror.

Figure 6:
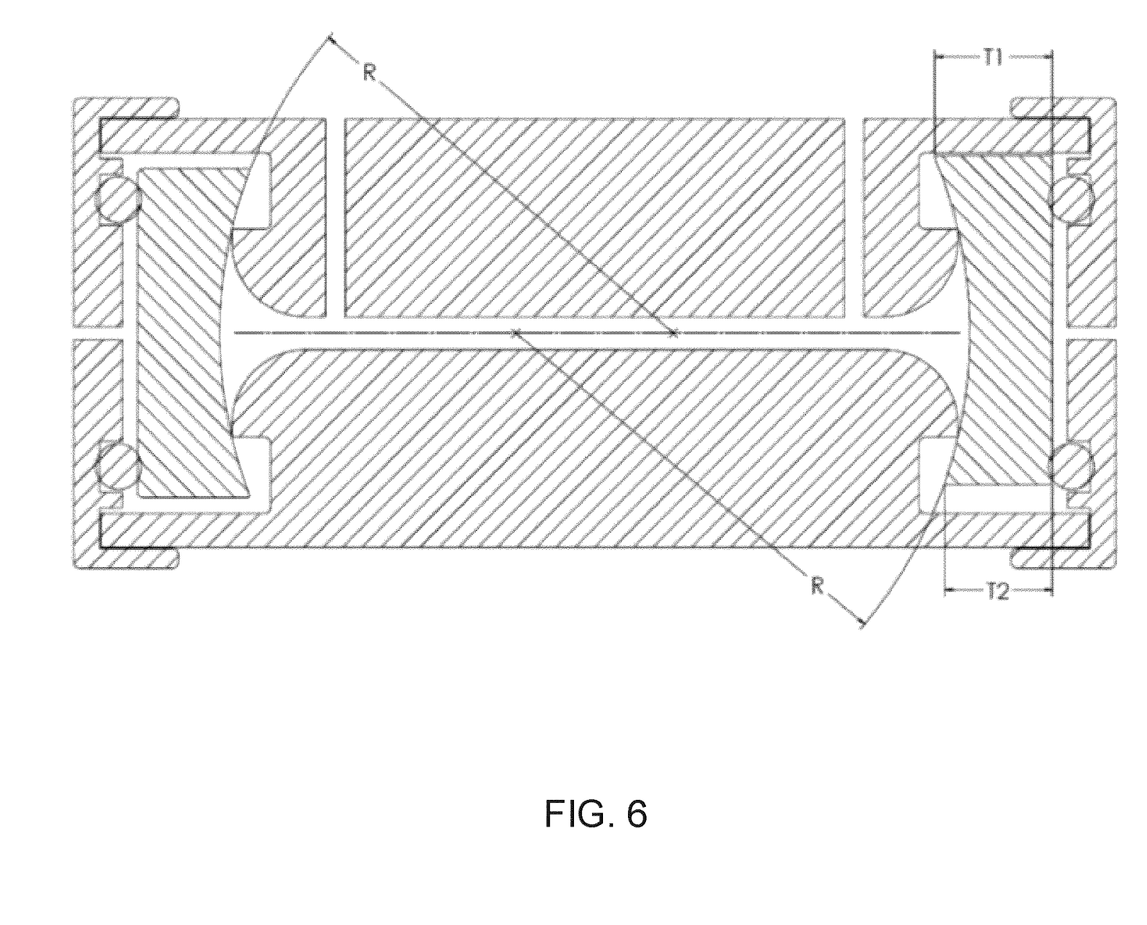
FIG. 6 illustrates a cross sectional view of a sensor cell in accordance with another embodiment of the present invention, with one geometrically imperfect mirror.

FIG. 6 depicts a sensor cell similar to as depicted in FIG. 1A, with the difference that it has geometrically perfect and unskewed left HR mirror and geometrically imperfect right HR mirror with respect to centration tolerance, shown as varying edge thickness depicted by reference characters T1 and T2.

As depicted in FIGS. 4 to 6, when the HR mirrors are placed in contact with their respective contact geometries/edge surfaces, the center of curvature of the first concave HR mirror and the centre of curvature of the second concave HR mirror aligns/co-incident with the optical axis of the optical cavity, irrespective of the optional scew and/or on imperfect mirror geometry conditions.

In FIGS. 1A, 3, and 4 to 6, the letter "R" represents the radius of the mirror.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

We claim:

1. A high finesse optical sensor cell for analyzing a gaseous sample using a light source, comprising:

a housing defining a linear optical cavity, having an optical axis extending between a first open end portion and a second open end portion of the housing, the housing comprising:
a first set of contact geometry located adjacent to a first end of the optical cavity, and a second set of contact geometry located adjacent to a second end of the optical cavity, wherein at least the first set of contact geometry is radially symmetrical about the optical axis, and wherein the first set of contact geometry defines a planar contact surface that is perpendicular to the optical axis of the optical cavity,
the first and second ends of the optical cavity being located within the first and second open end portions of the housing, respectively, and
an inlet port and an outlet port for conveying the gaseous sample into and out of the optical cavity;
a first highly reflective (HR) mirror assembly comprising:
a first HR mirror having a concave reflective surface, wherein the first set of contact geometry is adapted to contact the concave reflective surface of the first HR mirror; and
a first end cover being configured for removable attachment to the first open end portion of the housing and to maintain the concave reflective surface of the first HR mirror in contact with the first set of contact geometry, the first end cover having an opening for receiving an entrant beam of light coincident with the optical axis,
a second HR mirror assembly comprising:
a second HR mirror having a reflective surface, wherein the second set of contact geometry is adapted to contact the reflective surface of the second HR mirror;
a second end cover being configured for removable attachment to the second open end portion of the housing and to maintain the reflective surface of the second HR mirror in contact with the second set of contact geometry, the second end cover having an opening for emitting the beam of light to a detector coincident with the optical axis;
wherein the sensor cell further comprises:
a first sealing member to create a seal between the first end of the optical cavity and the reflective surface of the first HR mirror, and
a second sealing member to create a seal between the second end of the optical cavity and the reflective surface of the second HR mirror;
wherein the center of curvature of the first concave HR mirror is maintained in alignment (coincident) with the optical axis of the optical cavity without requiring mechanical adjustment.

2. The sensor cell of claim 1, wherein the first set of contact geometry is comprised of at least three coplanar points provided on an outer surface and/or an edge surface of a ring member provided at the periphery of the first end of the optical cavity, wherein the at least three coplanar points are adapted to contact the concave surface of the first HR mirror.

3. The sensor cell of claim 1, wherein the first set of contact geometry is the entire edge surface of a ring member provided at the periphery of the first end of the optical cavity.

4. The sensor cell of claim 1, wherein the first set of contact geometry is the entire outer surface of a ring member provided at the periphery of the first end of the optical cavity, which is adapted to match with the HR mirror's concave surface.

5. The sensor cell of claim 1, wherein the second HR mirror has a flat reflective surface, and the second set of contact geometry positions the flat HR mirror surface perpendicular to the axis of the optical cavity.

6. The sensor cell of claim 5, wherein the second set of contact geometry is comprised of at least three points provided on an outer surface of a ring member provided at the periphery of the second end of the optical cavity, wherein the at least three points are adapted to contact the flat surface of the second HR mirror.

7. The sensor cell of claim 1, wherein:
the second HR mirror has a concave reflective surface,
the second set of contact geometry is radially symmetrical about the optical axis, and,
the second set of contact geometry defines a planar contact surface that is perpendicular to the optical axis of the optical cavity;
wherein the center of curvature of the first concave HR mirror and the second concave HR mirror are in alignment with the optical axis of the optical cavity.

8. The sensor cell of claim 7, wherein the second set of contact geometry is comprised of at least three coplanar points provided on an outer surface and/or an edge surface of a ring member provided at the periphery of the second end of the optical cavity, wherein the at least three coplanar points are adapted to contact the concave surface of the second HR mirror.

9. The sensor cell of claim 7, wherein the second set of contact geometry is the entire edge surface of a ring member provided at the periphery of the second end of the optical cavity.

10. The sensor cell of claim 7, wherein the second set of contact geometry is the entire outer surface of a ring member provided at the periphery of the second end of the optical cavity.

11. The sensor cell of claim 1, wherein at least the first mirror assembly comprises a mirror pressing resilient member between the HR mirror and an inner surface of the end cover.

12. The apparatus of claim 11, wherein the resilient member is a spring or an O-ring made of a resilient material.

13. A sensor system, comprising:
a sensor cell as defined in claim 1;
a light source for providing an entrant light beam which is directed into the optical cavity and along the optical axis; and
a detector for detecting light exiting the optical cavity along the optical axis.

14. The sensor system of claim 13, wherein the entrant light beam is coincident with the optical axis.

15. The sensor system of claim 13, wherein the light source for the entrant light beam is a laser source.

16. The sensor system of claim 13, further comprising a data acquisition and analysis circuit connected to the detector.

17. The sensor cell of claim 1, wherein the first sealing member is provided between the first HR mirror and an inner surface of the first end cover.

18. The sensor cell of claim 1, wherein the first sealing member is provided on a ring member provided at the periphery of the first end of the optical cavity, said ring member comprising the first set of contact geometry on an outer surface and/or an edge surface thereof.

19. The sensor cell of claim 1, wherein the second sealing member is provided between the second HR mirror and an inner surface of the second end cover.

20. The sensor cell of claim 1, wherein the second sealing member is provided on a ring member provided at the periphery of the second end of the optical cavity, said ring member comprising the second set of contact geometry on an outer surface and/or an edge surface thereof.

* * * * *